(12) United States Patent
Dunn

(10) Patent No.: US 6,199,432 B1
(45) Date of Patent: Mar. 13, 2001

(54) FLUID PRESSURE TESTING

(75) Inventor: Derek Dunn, Aberdeen (GB)

(73) Assignee: BG PLC, Reading (GB)

( * ) Notice: Subject to any disclaimer, the term of this patent is extended or adjusted under 35 U.S.C. 154(b) by 0 days.

(21) Appl. No.: 09/048,295

(22) Filed: Mar. 26, 1998

(30) Foreign Application Priority Data

Mar. 23, 1998 (GB) .................................................. 9806084

(51) Int. Cl.⁷ ...................................................... G01L 7/00
(52) U.S. Cl. .................................................................. 73/756
(58) Field of Search ................................... 73/756, 865.8, 73/866.5, 40.5 A, 40.5 R; 137/317, 318; 285/132.1, 126.1

(56) References Cited

U.S. PATENT DOCUMENTS

| | | | |
|---|---|---|---|
| 4,067,353 | * | 1/1978 | DeHoff ................................. 137/318 |
| 4,224,687 | | 9/1980 | Claycomb .............................. 367/83 |
| 4,485,668 | * | 12/1984 | Hudson et al. .................... 73/40.5 A |
| 4,546,789 | * | 10/1985 | Taylor .................................. 137/317 |
| 4,649,948 | | 3/1987 | Hudson .................................. 137/15 |
| 5,025,670 | * | 6/1991 | McNulty et al. ................... 73/865.8 |
| 5,542,287 | * | 8/1996 | Powers .............................. 73/40.5 R |
| 5,612,499 | * | 3/1997 | Andrew et al. ..................... 73/866.5 |
| 5,740,830 | * | 4/1998 | Mankins ................................ 137/318 |

FOREIGN PATENT DOCUMENTS

| | | |
|---|---|---|
| 0126697 | 11/1984 | (EP) . |
| 0294244 | 12/1988 | (EP) . |
| 0627591 | 8/1949 | (GB) . |
| 1410194 | 10/1975 | (GB) . |
| 1566818 | 5/1980 | (GB) . |

* cited by examiner

Primary Examiner—William Oen
(74) Attorney, Agent, or Firm—William H. Holt

(57) ABSTRACT

A fluid testing arrangement includes an adaptor/connector 16 which couples to a service pipe 11 to allow fluid passage to continue from the main pipe 10. A catheter 18 is passed through the supplementary connection 17 and through the bore of the adaptor into the service pipe 11 until it reaches the main pipe tee connector 12. A logger 20 senses and measures the fluid pressure in effect, at the main pipe without the need to excavate.

15 Claims, 3 Drawing Sheets

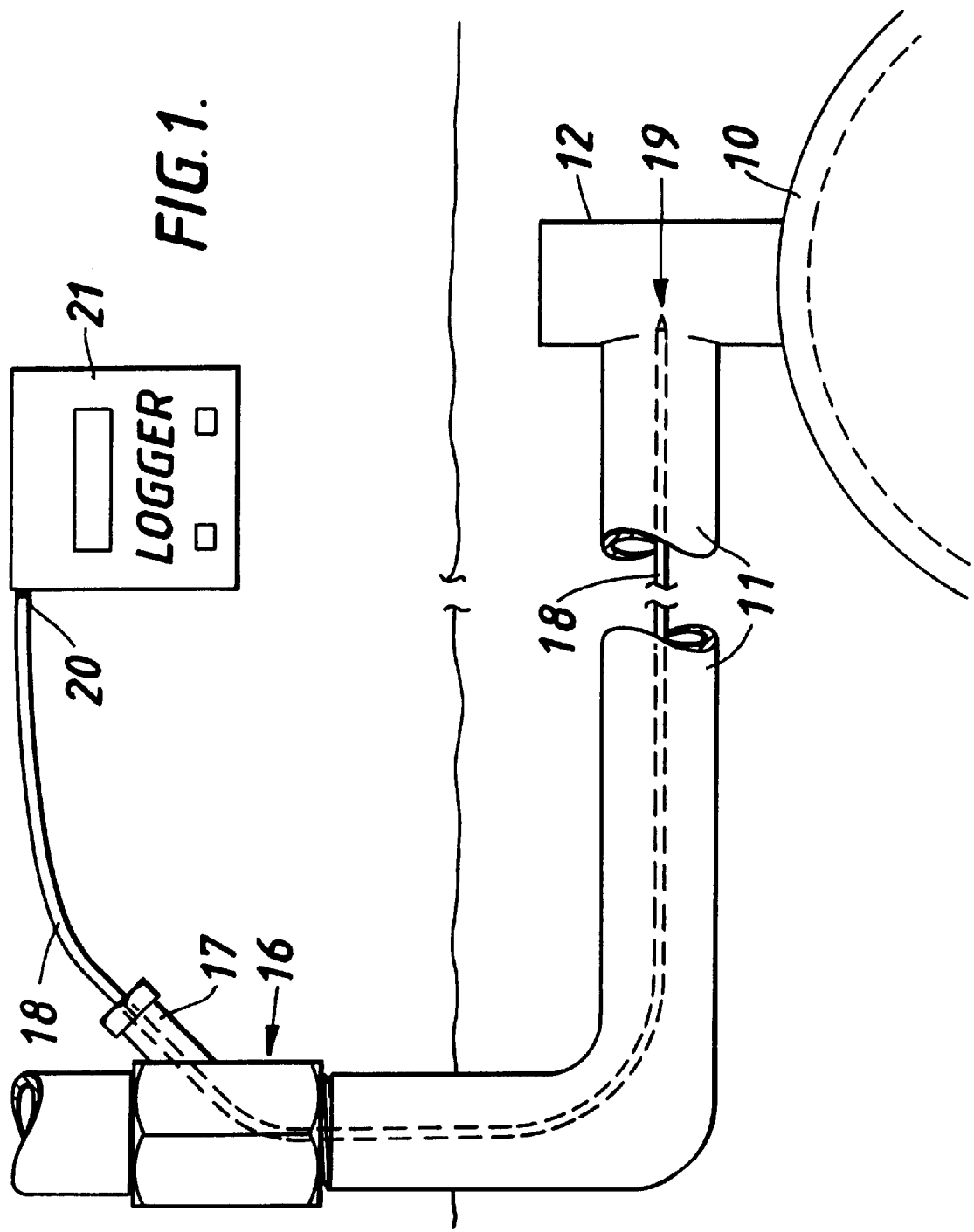

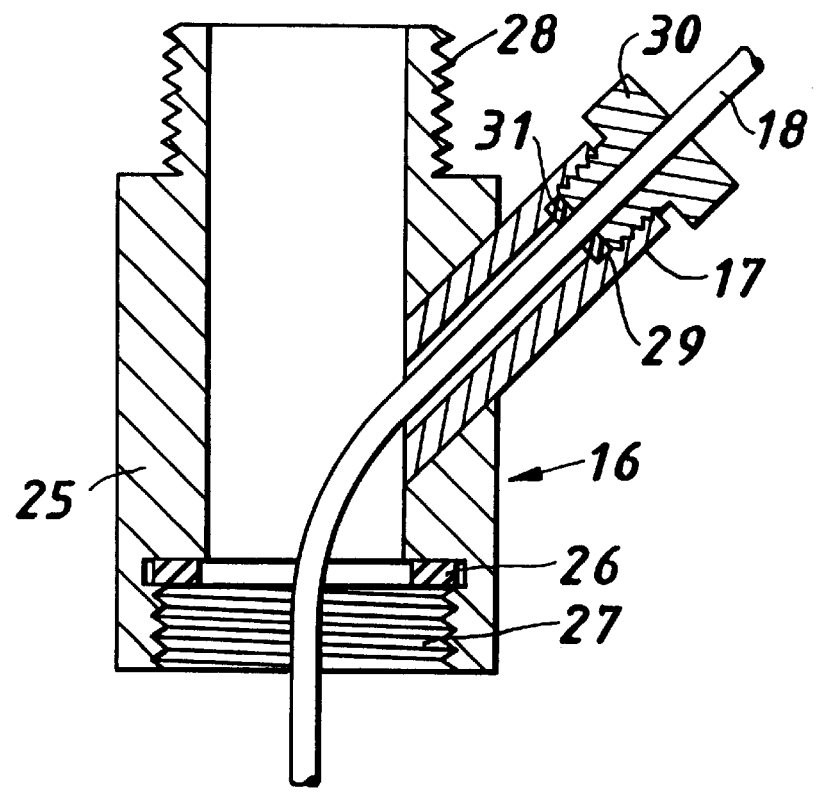
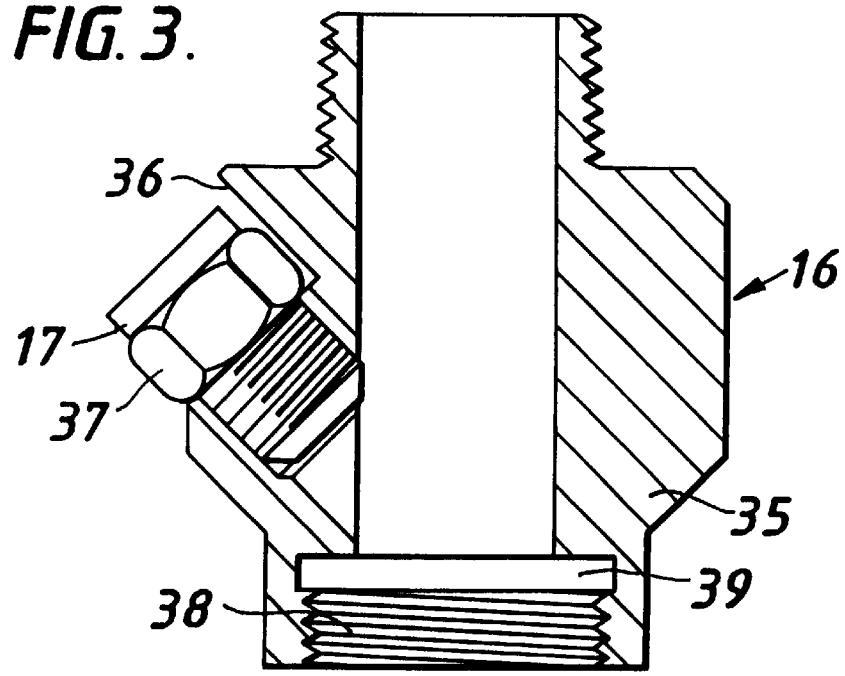

FLUID PRESSURE TESTING

The invention relates to fluid pressure testing and more particularly to monitoring fluid pressure remote from the sensing point.

In gas mains, for example, it is necessary from time to time to measure pressure in the main at one or more particular locations. This normally requires excavation in the street and reinstatement thereafter causing disruption and costly work. The present invention is concerned with avoiding such procedures.

According to the invention there is provided apparatus for providing remote testing of fluid pressure within a main pipe and comprising coupling means for coupling a pressure testing device to an auxiliary pipe connected to the main pipe, and elongate means for providing an independent passage between the coupling means and the main pipe via the bore of the auxiliary pipe to provide a pressure sensing path adjacent the main pipe to detect main pipe fluid pressure.

Further according to the invention there is provided a method for remote testing of fluid pressure within a main pipe and comprising coupling a pressure testing device to an auxiliary pipe connected to the main pipe, providing an independent passage between the coupling testing device and the main pipe by utilising elongate means fed through the auxiliary pipe bore to allow pressure testing of the main pipe pressure to be effected.

Still further according to the invention there is provided a pipe coupling device including a body with a bore therethrough, means for connecting the body with a first pipe, means for connecting the body to a second pipe to allow fluid flow between the first and second pipes in use, and means for receiving a catheter or the like so as to allow a portion of the catheter to pass into the first or second pipe through the coupling device bore, in use.

The invention will now be described by way of example with reference to the accompanying drawings in which:

FIG. 1 shows remote accessing and monitoring of gas main pressure by means of an adaptor and catheter through a service pipe;

FIG. 2 shows a sectional view of the adaptor shown in FIG. 1;

FIG. 3 shows an alternative form of the adaptor of FIG. 1;

Figure 4:
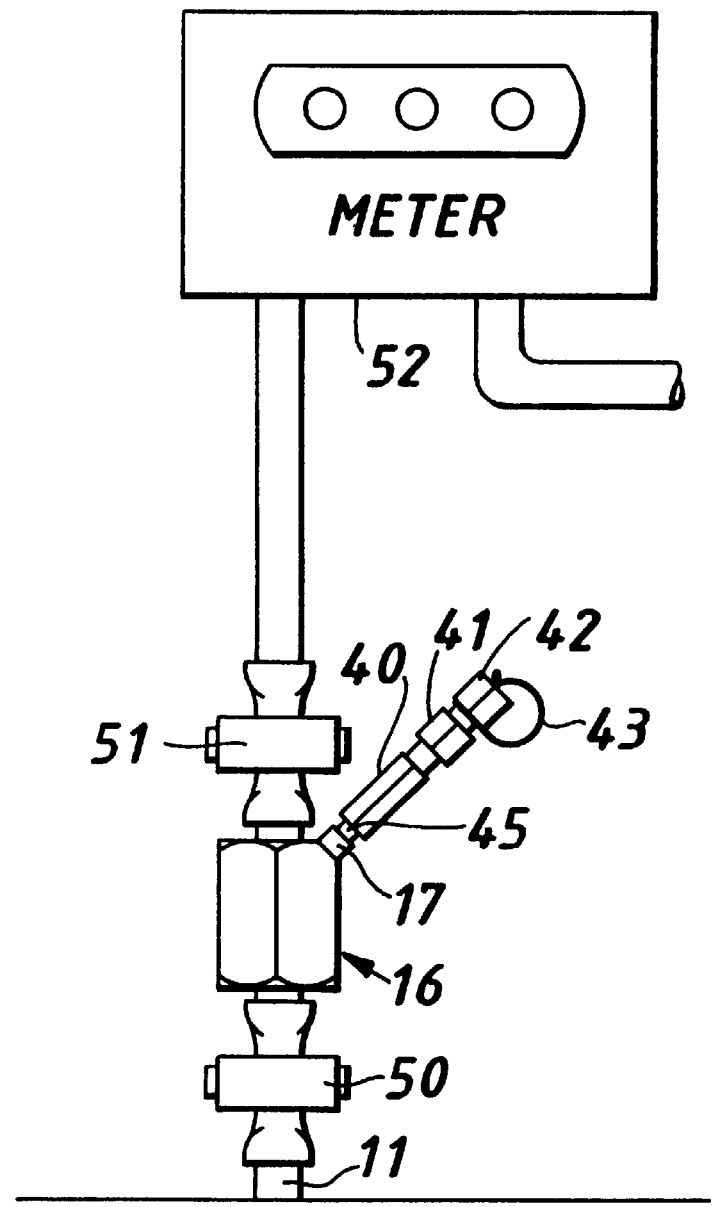
FIG. 4 shows an alternative position for the adaptor which carries a sealable access device.

In the FIG. 1 arrangement, a gas main 10 has a service pipe 11 connected to it via a service tee 12. The service pipe connects to the customers' gas appliances via a gas tap or cock and a metering device (not shown). In order to verify the pressure in the main 10 it is normally required to excavate at a position along the main and attach a monitor device directly to the main. Thereafter reinstatement will be required. Such procedures are expensive. In the FIG. 1 arrangement, in order to overcome this requirement, an adaptor/connector 16 is provided which is capable of connecting either side the service pipe and carries a supplementary connection 17 for allowing a catheter 18 to pass through the adaptor 16 and through the entire length of the service pipe 11 to the main 10, which length could be up to 30 meters for example.

The catheter 18 (e.g. nylon) terminates with an angled face 19 to assist in insertion as well as offering an angled entry point for the fluid to be monitored. The other end 20 of the catheter is affixed to a monitor/logger device 21 to allow gas pressure from the main to be determined, typically over a preset time period.

It has been determined that the recorded pressure by this method is substantially the same as that measured directly at the main, even when gas is being utilised by the customer during the measuring period. The adaptor 16 does not interrupt the flow of gas to the customer and the relatively small diameter catheter compared to the service pipe diameter does not restrict the flow either.

The logger device 21 can be set to determine the gas main pressure over an extended period if desired. In a 90 mm gas main, the pressure as measured will show small fluctuations around a 25 mBar pressure, for example. The adaptor/connector 16 is shown in more detail in the sectional view of FIG. 2.

The device 16 includes a hexagonal body with a generally cylindrical internal body portion 25 having an internally threaded portion 27 (e.g. 1.145"×12TPI) at its lower end. A resilient sealing ring 26 is provided to effect a seal when the adaptor is connected to the pipe. The upper body terminates in an externally threaded portion 28 (e.g. ¾ BSP tapered) for connection to the service pipe or component.

The angled supplementary connection 17 extends from the body and includes an internally threaded portion 29 (e.g. ¼"×19 BSP tapered) which allows the fitting of a tube nut 30 which tightens onto a tube sleeve (olive) 31 on the catheter so as to effect a seal after the catheter has been passed into the service pipe to the desired position adjacent the main.

An alternative embodiment of the adaptor/connector 16 is shown in FIG. 3. This includes a generally cylindrical portion 35 with flats to assist in tightening the fitting. The connection 17 includes internally threaded insert 37 for receiving the catheter 18 and its seal ring. The connector 17 being angled downwards assists in catheter insertion into the service pipe.

It is expedient to utilise the customers' service tap/cock when fitting the device to the service pipe to prevent gas escape and it may be appropriate to have a semi-permanent catheter access point for repeat measurements at intermittent intervals. FIG. 4 shows an arrangement for such requirements.

The FIG. 4 arrangement shows the service pipe 11 connected to the tap 50 which would thereafter normally be connected directly to the meter 52. In this arrangement however the adaptor/connector 16 is connected to tap 50 and in turn is connected to a further tap 51 before the meter connection for reasons now described.

To fit the catheter and adaptor arrangement to an existing gas carrying service pipe 11, the gas tap 50 is firstly closed (after turning off any appliances) to isolate the supply and the adaptor/connector 16 together with the second gas tap 51 are inserted before the meter 52. The first tap 50 is then opened to allow the catheter to pass through the open tap orifice into the service pipe towards the main. The flexible catheter is sufficiently pliant to move through this orifice. Safety procedures will be utilised, such as clamping the end of the catheter to be connected to the logger and avoiding other sources of leakage or static build up.

In the case where the catheter is to be connected to the logger straight away then the tube unit 30 and tube olive 31 of FIG. 2 would be used.

The second tap 51 provides the customer with the means of turning off the gas supply. The handle from tap 50 will typically be remoted as this tap is no longer operative.

In the case where the logger is to be fitted later, the additional arrangement of FIG. 4 is provided. The catheter is terminated within the connection 17 and it carries the ring/olive 31 adjacent its end. A hexagonal extension 40 has an externally threaded portion 45 which screws into the connection 17, at the same time sealing against the catheter. The extension 40 has an upper internally threaded portion which receives a sealing device 41. The sealing device 41 (e.g. P plug) includes an upper externally threaded portion which allows end closure portion 42 to screw on to this. A strap 43 allows the end portion 42 to remain with device 41 when unscrewed to prevent loss. The sealing device 41 has a central body portion consisting of a resilient seal which is normally closed unless penetrated by a suitable inserted device. Hence the arrangement, once assembled, is sealed for future use.

Figure 5:
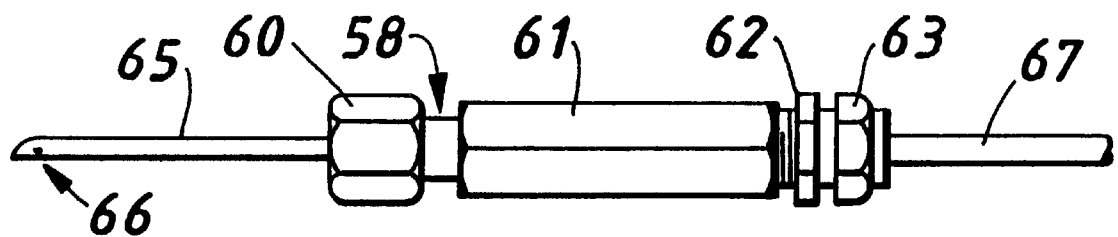
FIG. 5 shows a connector from the monitor or logger which terminates in a needle for insertion into the sealable access device.

To carry out the monitoring/logging operations, a probe is utilised as shown in FIG. 5.

The probe 58 includes a hollow steel needle 65 with a small aperture 66 adjacent the end. The needle is inserted into the sealing device 41 (having removed the end cap portion 42) by means of applying pressure whilst gripping hexagonal handle portion 61. The needle when inserted will cause an aperture to form in sealing device 41 sufficient to allow it to pass into the extension 40 to gain access to the gas from the catheter. A locking coupling nut 60 holds the probe in place. The internal bore of the needle and the handle 61 pass the gas towards the rear of the probe which carries the catheter tube 67 connected to the logger and which connects to the probe by means of the tube connectors 62 and 63. After sensing or testing readings have been taken, the probe can be withdrawn and sealing device 41 causes the extension to become automatically sealed once again, so preventing gas leakage.

What is claimed is:

1. Apparatus for providing remote testing of fluid pressure within a main pipe, said apparatus comprising coupling means for coupling a pressure testing device to an auxiliary pipe having a bore therethrough and connected to the main pipe, and elongate flexible fluid bore means for providing an independent passage between the coupling means and the main pipe via the bore of the auxiliary pipe to provide a fluid pressure sensing path adjacent the main pipe to detect main pipe fluid pressure.

2. Apparatus as claimed in claim 1, wherein the coupling means includes a body portion with a bore therethrough and means for connecting the body to first and second portions of the auxiliary pipe to allow flow of fluid therebetween and connector means on the body to allow the elongate means to pass into the auxiliary pipe via the bore in the body portion.

3. Apparatus as claimed in claim 1, wherein the elongate means comprises a flexible narrow bore catheter device sealable to the coupling means.

4. Apparatus as claimed in claim 3, wherein the catheter device is configured to be sufficiently flexible to allow passage through an aperture in the bore of an open tap connected to control fluid passage through the auxiliary pipe.

5. Apparatus as claimed in claim 1, wherein the coupling means includes probe receiving means for receiving a probe via a sealable passage to link the probe to the elongate means in use, said probe being connected to the pressure testing device.

6. Apparatus as claimed in claim 5, wherein the sealable passage includes seal means configured to be normally closed and on insertion of the probe a needle-like portion thereof produces a temporary aperture in the seal means.

7. A method for remote testing of fluid pressure within a main pipe, said method comprising the steps of coupling a pressure testing device to an auxiliary pipe having a bore therethrough and connected to the main pipe, providing an independent passage between the coupling testing device and the main pipe by utilising elongate flexible fluid bore means fed through the auxiliary pipe bore to allow fluid pressure testing of the main pipe pressure to be effected.

8. A method as claimed in claim 7, wherein the elongate means is fed through both a coupling and a fluid tap on its passage to the main pipe.

9. A method as claimed in claim 7, wherein pressure testing means includes a probe and the method includes the step of inserting the probe into a normally sealed passage in the coupling to link the probe to the elongate means for testing purposes.

10. A pipe coupling device for insertion between two pipes and including a body with a bore therethrough, means for connecting the body with a first pipe, means for connecting the body to a second pipe to allow fluid flow between the first and second pipes in use, and catheter receiving means for receiving a catheter and configured to allow a portion of the catheter to pass into the first or second pipe through the coupling bore, in use.

11. A device as claimed in claim 10, wherein the means for receiving the catheter includes a sealable passage extending from the bore in the body to allow the outer wall of the catheter to be sealed to prevent fluid leakage in use.

12. A device as claimed in claim 10, wherein the means for receiving the catheter includes probe receiving means, said receiving means includes a normally sealed aperature which is automatically opened on insertion of the probe to link the probe to the catheter, the probe being connected in use to a pressure sensing device.

13. Apparatus as claimed in claim 1 including a fluid tap in said auxiliary pipe spaced from said coupling means, said fluid tap including a tap bore therethrough and wherein said elongate flexible fluid bore means is configured to flexibly pass through said tap bore when said fluid tap is in an open position.

14. A pipe coupling device as claimed in claim 10 wherein said means for connecting the body to said first and second pipes comprise first and second threaded portions, said catheter receiving means being configured for receiving a catheter for passing to a remote location relative to the bore of the body in use, said catheter when in position still allowing fluid to pass between said first and second pipes.

15. A pipe coupling device as claimed in claim 12 wherein said pressure sensing device includes a logger for determining pressure over a selected period of time.

* * * * *